(12) United States Patent
Andersen et al.

(10) Patent No.: US 10,386,922 B2
(45) Date of Patent: Aug. 20, 2019

(54) HANDHELD CONTROLLER WITH TRIGGER BUTTON AND SENSOR RETAINER ASSEMBLY

(71) Applicant: Oculus VR, LLC, Menlo Park, CA (US)

(72) Inventors: Blake Francis Andersen, Snoqualmie, WA (US); Julian James Hammerstein, Atherton, CA (US); Jason Andrew Higgins, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 42 days.

(21) Appl. No.: 15/173,558

(22) Filed: Jun. 3, 2016

(65) Prior Publication Data

US 2017/0192506 A1 Jul. 6, 2017

Related U.S. Application Data

(60) Provisional application No. 62/273,428, filed on Dec. 30, 2015.

(51) Int. Cl.
*G06F 3/01* (2006.01)
*G06T 19/00* (2011.01)
(Continued)

(52) U.S. Cl.
CPC .............. *G06F 3/014* (2013.01); *G06F 3/011* (2013.01); *G06F 3/017* (2013.01); *G06F 3/0202* (2013.01); *G06F 3/0304* (2013.01); *G06F 3/0338* (2013.01); *G06F 3/044* (2013.01); *G06F 3/0416* (2013.01); *G06T 19/006* (2013.01)

(58) Field of Classification Search
CPC .......... G06F 3/011; G06F 3/017; G06F 3/014; G06F 3/0202; G06F 3/0304; G06F 3/0338; G06F 3/0416; G06F 3/044; A63F 13/20; A63F 13/24; G06T 19/006
See application file for complete search history.

(56) References Cited

U.S. PATENT DOCUMENTS 4,518,164 A 5/1985 Hayford, Jr. et al.
4,520,248 A * 5/1985 Woelfel ............... H01H 13/702
200/514
(Continued)

OTHER PUBLICATIONS

Final Office Action dated Aug. 18, 2017 for U.S. Appl. No. 14/939,470 by Long, C., et al., filed Nov. 12, 2015.
(Continued)

*Primary Examiner* — Michael A Faragalla
*Assistant Examiner* — Sujit Shah
(74) *Attorney, Agent, or Firm* — FisherBroyles, LLP

(57) ABSTRACT

Handheld controllers are disclosed herein. In one embodiment, the controller includes a main body and a sensor assembly at least partially disposed in the main body. The sensor assembly can include a control surface (e.g., a button) configured to receive at least a portion of a user's finger. A sensor portion can be disposed between the control surface and a rear member. The sensor portion can comprise a foam layer, a backing layer and a sensor layer between the foam layer and the backing layer. The foam layer can be compressed toward the control surface to minimize an air gap between the sensor layer and the control surface.

20 Claims, 6 Drawing Sheets

(51) Int. Cl.
*G06F 3/044* (2006.01)
*G06F 3/041* (2006.01)
*G06F 3/02* (2006.01)
*G06F 3/03* (2006.01)
*G06F 3/0338* (2013.01)

(56) References Cited

U.S. PATENT DOCUMENTS

| | | | |
|---|---|---|---|
| 4,552,360 A | 11/1985 | Schenck et al. | |
| 5,087,825 A * | 2/1992 | Ingraham | H01H 13/702 |
| | | | 200/511 |
| 5,181,009 A | 1/1993 | Perona | |
| 5,207,426 A * | 5/1993 | Inoue | A63F 13/06 |
| | | | 345/184 |
| D341,094 S | 11/1993 | Austin | |
| 5,265,009 A | 11/1993 | Colavita et al. | |
| D350,351 S | 9/1994 | Nakamura | |
| 5,421,590 A | 6/1995 | Robbins et al. | |
| D363,320 S | 10/1995 | Barthelemy et al. | |
| 5,479,163 A | 12/1995 | Samulewicz | |
| D369,754 S | 5/1996 | Donaldson | |
| 5,551,701 A | 9/1996 | Bouton et al. | |
| 5,616,078 A | 4/1997 | Oh et al. | |
| 5,645,277 A | 7/1997 | Cheng | |
| 5,796,354 A | 8/1998 | Cartabiano et al. | |
| 5,982,355 A | 11/1999 | Jaeger et al. | |
| D418,174 S | 12/1999 | Jankowski | |
| D418,879 S | 1/2000 | Hornsby et al. | |
| 6,173,203 B1 | 1/2001 | Barkley et al. | |
| 6,192,253 B1 | 2/2001 | Charlier et al. | |
| 6,430,110 B2 | 8/2002 | Baroche et al. | |
| D472,972 S | 4/2003 | Anderson et al. | |
| 6,544,124 B2 | 4/2003 | Woodward et al. | |
| 6,572,108 B1 | 6/2003 | Bristow | |
| 6,590,835 B2 | 7/2003 | Farine et al. | |
| 6,652,383 B1 | 11/2003 | Sonoda et al. | |
| 6,970,157 B2 | 11/2005 | Siddeeq et al. | |
| 7,004,469 B2 | 2/2006 | von Goeben et al. | |
| 7,106,197 B2 | 9/2006 | Gaiotto et al. | |
| 7,331,793 B2 | 2/2008 | Hernandez et al. | |
| 7,345,670 B2 | 3/2008 | Armstrong et al. | |
| D586,823 S | 2/2009 | Anderson et al. | |
| D616,417 S | 5/2010 | Liao et al. | |
| 8,064,972 B2 | 11/2011 | Russo et al. | |
| D656,996 S | 4/2012 | Mikhailov et al. | |
| 8,188,842 B2 | 5/2012 | Otsuka et al. | |
| 8,267,786 B2 | 9/2012 | Ikeda | |
| 8,439,753 B2 | 5/2013 | Nagata et al. | |
| 8,795,078 B1 | 8/2014 | Musick, Jr. et al. | |
| 8,882,596 B2 | 11/2014 | Takahashi et al. | |
| 8,994,643 B2 | 3/2015 | Goodwin et al. | |
| D729,803 S | 5/2015 | Avery | |
| 9,141,087 B2 | 9/2015 | Brown et al. | |
| 9,386,662 B1 | 7/2016 | Krueger et al. | |
| 9,421,472 B2 | 8/2016 | Buller et al. | |
| D772,986 S | 11/2016 | Bristol et al. | |
| D780,807 S | 3/2017 | Bristol et al. | |
| 9,678,566 B2 | 6/2017 | Webb et al. | |
| D795,959 S | 8/2017 | Hubler et al. | |
| D800,841 S | 10/2017 | Hubler et al. | |
| 9,804,693 B2 | 10/2017 | Long | |
| D802,055 S | 11/2017 | Chen et al. | |
| 9,839,840 B2 | 12/2017 | Long et al. | |
| 2001/0015718 A1 | 8/2001 | Hinckley et al. | |
| 2001/0045938 A1 | 11/2001 | Willner et al. | |
| 2002/0072415 A1* | 6/2002 | Kikukawa | G06F 3/016 |
| | | | 463/43 |
| 2003/0100367 A1 | 5/2003 | Cooke et al. | |
| 2004/0222963 A1 | 11/2004 | Guo et al. | |
| 2004/0222970 A1 | 11/2004 | Martinez et al. | |
| 2005/0248544 A1* | 11/2005 | Adam | H03K 17/962 |
| | | | 345/173 |
| 2005/0255915 A1 | 11/2005 | Riggs et al. | |
| 2006/0287089 A1 | 12/2006 | Addington et al. | |
| 2007/0049374 A1 | 3/2007 | Ikeda et al. | |
| 2007/0066394 A1 | 3/2007 | Ikeda et al. | |
| 2007/0084293 A1* | 4/2007 | Kaiserman | B60N 2/002 |
| | | | 73/763 |
| 2007/0293318 A1 | 12/2007 | Tetterington et al. | |
| 2008/0261693 A1 | 10/2008 | Zalewski et al. | |
| 2008/0261695 A1 | 10/2008 | Coe et al. | |
| 2009/0005164 A1 | 1/2009 | Chang et al. | |
| 2009/0143110 A1 | 6/2009 | Armstrong et al. | |
| 2009/0149256 A1 | 6/2009 | Lui et al. | |
| 2009/0290345 A1 | 11/2009 | Shaner et al. | |
| 2009/0295721 A1 | 12/2009 | Yamamoto et al. | |
| 2009/0298590 A1 | 12/2009 | Marks et al. | |
| 2010/0009760 A1 | 1/2010 | Shimamura et al. | |
| 2010/0085321 A1 | 4/2010 | Pundsack et al. | |
| 2010/0118195 A1 | 5/2010 | Eom et al. | |
| 2010/0144436 A1 | 6/2010 | Marks et al. | |
| 2010/0184513 A1 | 7/2010 | Mukasa et al. | |
| 2011/0294579 A1 | 12/2011 | Marks et al. | |
| 2012/0088582 A1 | 4/2012 | Wu et al. | |
| 2012/0202597 A1 | 8/2012 | Yee et al. | |
| 2012/0261551 A1* | 10/2012 | Rogers | G02B 3/14 |
| | | | 250/208.1 |
| 2013/0162450 A1* | 6/2013 | Leong | H01H 13/7065 |
| | | | 341/20 |
| 2013/0194181 A1* | 8/2013 | Nakajima | G06F 3/033 |
| | | | 345/157 |
| 2013/0324254 A1 | 12/2013 | Huang et al. | |
| 2014/0015813 A1 | 1/2014 | Numaguchi et al. | |
| 2014/0141891 A1 | 5/2014 | Georgy et al. | |
| 2014/0172186 A1* | 6/2014 | Mashkevich | G05G 1/00 |
| | | | 701/1 |
| 2014/0203953 A1* | 7/2014 | Moser | G06F 3/0202 |
| | | | 341/27 |
| 2014/0228124 A1 | 8/2014 | Plagge et al. | |
| 2014/0273546 A1 | 9/2014 | Harmon et al. | |
| 2014/0361977 A1 | 12/2014 | Mao et al. | |
| 2014/0362110 A1 | 12/2014 | Stafford | |
| 2014/0364212 A1 | 12/2014 | Osman et al. | |
| 2014/0378227 A1* | 12/2014 | Lee | A63F 13/24 |
| | | | 463/37 |
| 2015/0077398 A1 | 3/2015 | Yairi et al. | |
| 2015/0094142 A1 | 4/2015 | Stafford | |
| 2015/0155445 A1 | 6/2015 | Crowder et al. | |
| 2015/0234477 A1 | 8/2015 | Watson et al. | |
| 2015/0253574 A1 | 9/2015 | Thurber | |
| 2015/0258431 A1 | 9/2015 | Strafford et al. | |
| 2015/0258432 A1 | 9/2015 | Tokubo et al. | |
| 2015/0261297 A1* | 9/2015 | Quek | G06F 3/044 |
| | | | 345/174 |
| 2015/0268920 A1 | 9/2015 | Schapiro | |
| 2015/0370320 A1 | 12/2015 | Connor et al. | |
| 2016/0351362 A1* | 12/2016 | Tsai | H01H 21/22 |
| 2016/0357249 A1 | 12/2016 | Webb et al. | |
| 2016/0357261 A1 | 12/2016 | Webb et al. | |
| 2016/0361637 A1 | 12/2016 | Bristol et al. | |
| 2016/0361638 A1 | 12/2016 | Rogoza et al. | |
| 2016/0363996 A1 | 12/2016 | Rogoza et al. | |
| 2016/0364910 A1 | 12/2016 | Katz et al. | |
| 2017/0128828 A1 | 5/2017 | Long | |
| 2017/0131767 A1 | 5/2017 | Long | |
| 2017/0136351 A1 | 5/2017 | Long | |
| 2017/0139481 A1 | 5/2017 | Long et al. | |
| 2017/0168303 A1 | 6/2017 | Petrov et al. | |
| 2017/0177102 A1 | 6/2017 | Long et al. | |
| 2017/0189798 A1 | 7/2017 | Rogoza et al. | |
| 2017/0189799 A1 | 7/2017 | Anderson et al. | |
| 2017/0189802 A1 | 7/2017 | Rogoza et al. | |
| 2017/0192495 A1 | 7/2017 | Drinkwater et al. | |

OTHER PUBLICATIONS

Non-Final Office Action dated Aug. 24, 2017 for U.S. Appl. No. 14/991,875 by Drinkwater, J., et al., filed Jan. 8, 2016.
Notice of Allowance dated Sep. 15, 2017 for U.S. Appl. No. 14/975,049 by Long, C. et al., filed Dec. 15, 2015.
U.S. Appl. No. 29/611,924 by Chen, Y., et al., filed Jul. 26, 2017.
Canadian Examiner's Report in Patent Application No. 163,150, dated Dec. 15, 2015, 5 pages.

(56) References Cited

OTHER PUBLICATIONS

Canadian Examiner's Report in Patent Application No. 163,150, dated Apr. 8, 2016, 7 pages.
Canadian Examiner's Report in Patent Application No. 167,457, dated Apr. 8, 2016, 1 page.
Canadian Examiner's Report in Patent Application No. 167,458, dated Apr. 8, 2016, 1 page.
Canadian Examiner's Report in Patent Application No. 167,456, dated Apr. 8, 2016, 1 page.
First Examination Report in Indian Patent Application No. 278272, dated Mar. 18, 2016, 2 pages.
First Examination Report in Indian Patent Application No. 278275, dated Mar. 28, 2016, 2 pages.
First Examination Report in Indian Patent Application No. 278274, dated Mar. 14, 2016, 2 pages.
First Examination Report in Indian Patent Application No. 278273, dated Mar. 18, 2016, 2 pages.
Office Action in Korean Patent Application No. 30/2015-0063452, dated Aug. 9, 2016, 3 pages.
Office Action in Mexican Design Patent Application No. MX/f/2015/003769, dated Feb. 7, 2017, 4 pages.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 14/939,431 by Long, C., et al., filed Nov. 12, 2015.
U.S. Appl. No. 14/934,073 by Long, C., et al., filed Nov. 5, 2015.
U.S. Appl. No. 14/939,470 by Long, C., et al., filed Nov. 12, 2015.
U.S. Appl. No. 14/975,049 by Long, C., et al., filed Dec. 18, 2015.
U.S. Appl. No. 14/934,090 by Long, C., et al., filed Nov. 5, 2015.
U.S. Appl. No. 15/172,099 by Rogoza, B., et al., filed Jun. 2, 2016.
U.S. Appl. No. 15/173,474 by Rogoza, B., et al., filed Jun. 3, 2016.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, for U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 23, 2017 for U.S. Appl. No. 14/934,073 by Long, C., et al., filed Nov. 5, 2015.
Non-Final Office Action dated Mar. 30, 2017 for U.S. Appl. No. 14/939,470 by Long, C., et al., filed Nov. 12, 2015.
Non-Final Office Action dated Apr. 7, 2017 for U.S. Appl. No. 14/975,049 by Long, C., et al., filed Dec. 18, 2015.
Ex Parte Quayle Action dated May 5, 2017 for U.S. Appl. No. 29/571,027 by Chen, Y., et al., filed Jul. 13, 2016.
Ex Parte Quayle Action dated May 5, 2017 for U.S. Appl. No. 29/571,030 by Chen, Y., et al., filed Jul. 13, 2016.
Ex Parte Quayle Action dated May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.
Office Action in Brazil Design Patent Application No. 30-2015-005620-7, dated May 30, 2017, 30 pages.
Supplemental Notice of Allowability dated Jul. 10, 2017 of U.S. Appl. No. 29/571,030 by Chen, Y., et al., filed Jul. 13, 2016.
Supplemental Notice of Allowability dated Jul. 6, 2017 for U.S. Appl. No. 29/571,025 by Chen, Y., et al., filed Jul. 13, 2016.
Non-Final Office Action dated Jul. 17, 2017 for U.S. Appl. No. 14/939,431 by Long, C., et al., filed Nov. 12, 2015.
"STEM System" accessed and printed from URL <http://sixense.com/wireless>, 5 pages.
Final Office Action dated Nov. 2, 2017 for U.S. Appl. No. 14/934,073 by Long, C., et al., filed Nov. 5, 2015.
Notice of Allowance dated Oct. 20, 2017 for U.S. Appl. No. 14/934,090 by Long, C., et al., filed Nov. 5, 2015.
Restriction Requirement dated Oct. 12, 2017 for U.S. Appl. No. 29/579,091 by Chen, Y., et al., filed Sep. 27, 2016.
Supplemental Notice of Allowability dated Sep. 29, 2017 for U.S. Appl. No. 29/571,027 by Chen, Y., et al., filed Jul. 13, 2016.
Tested, "Hands-On with Sixense STEM VR Motion-Tracking System" accessed and printed from URL <https://www.youtube.com/watch?v=C8z-On6FBTM>, 5 pages.
Advisory Action dated Dec. 27, 2017 for U.S. Appl. No. 14/939,470 by Long, C., et al., filed Nov. 12, 2015.
Notice of Allowance dated Dec. 22, 2017 for U.S. Appl. No. 14/991,875 by Drinkwater, J., et al., filed Jan. 8, 2016.

* cited by examiner

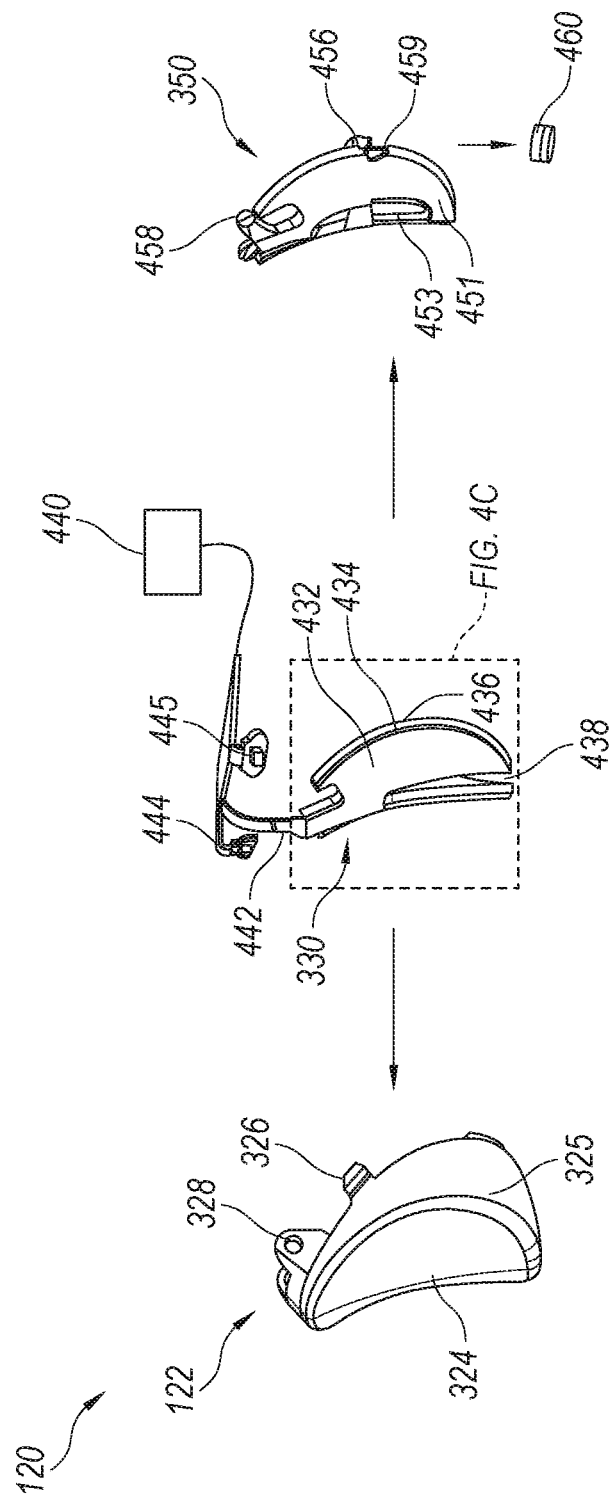

HANDHELD CONTROLLER WITH TRIGGER BUTTON AND SENSOR RETAINER ASSEMBLY

CROSS-REFERENCE TO RELATED APPLICATION(S)

This application claims priority to U.S. Provisional Patent Application No. 62/273,428, filed Dec. 30, 2015, entitled "Handheld Controller with Trigger Button and Sensor Retainer Assembly" which is incorporated in its entirety by reference thereto.

TECHNICAL FIELD

This patent application is directed to handheld controllers and, more specifically, to virtual reality handheld controllers.

BACKGROUND

In a virtual reality system, a user wears a head-mounted display that presents a selected virtual reality (VR) environment in front of the user's eyes. In some VR systems, a user can manipulate items in the virtual environment with handheld controllers. The controllers can include, for example, tracking patterns comprised of a pattern of lights. The system monitors the movement of the tracking patterns with a tracking camera and reproduces the user's hand movements in the virtual environment. However, buttons traditionally used on game controllers, for example, do not typically detect detailed hand movements. Conventional button configurations cannot usually capture, for example, individual finger movements and gestures and/or opened or closed hand movements.

BRIEF DESCRIPTION OF THE DRAWINGS

Embodiments of the methods and apparatus for detecting a user's hand presence or motion introduced herein may be better understood by referring to the following Detailed Description in conjunction with the accompanying drawings, in which like reference numerals indicate identical or functionally similar elements:

FIG. 4A is a partially exploded schematic right side view of a control button with a sensor assembly configured in accordance with an embodiment of the disclosed technology.

Figure 1:
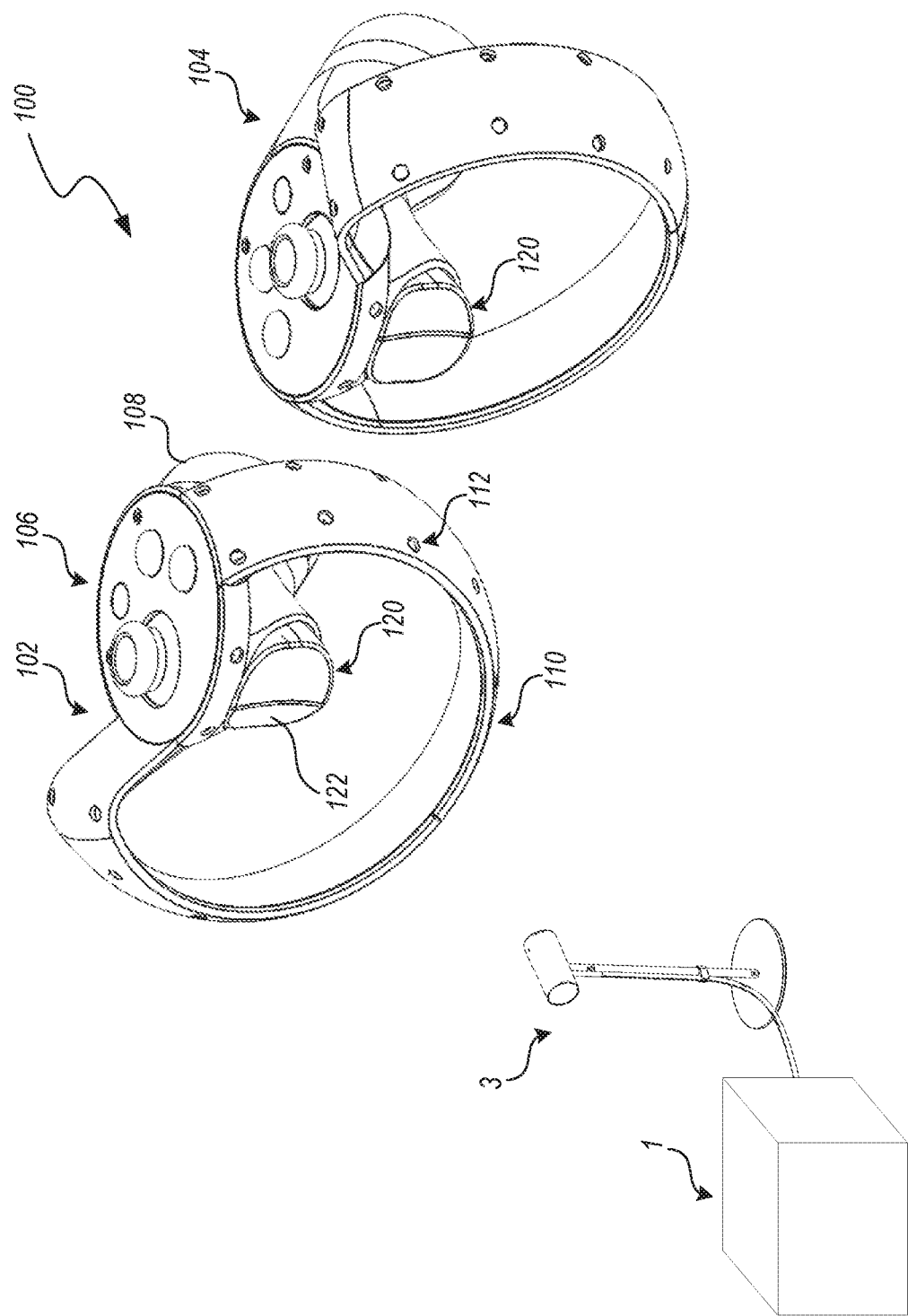
FIG. 1 is an isometric view of a pair of handheld controllers each configured to detect a user's hand presence or motion in accordance with embodiments of the disclosed technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

Handheld controllers with trigger buttons connected to a sensor retaining assemblies are disclosed herein. In one embodiment, for example, a handheld controller includes a trigger button on the controller's handle. The trigger button includes a sensor stack positioned between the finger-engaging portion and the rear member. The sensor stack includes a sensor support layer sandwiched between a compressible layer and a backing layer. The trigger button is configured so that the finger engaging portion presses against the compressible layer so as to minimizing any gap between the sensor support layer and control member, thereby providing improved feel and responsiveness of the trigger button.

In one embodiment, a handheld controller includes a housing and a button at least partially disposed in the housing. The button includes a control member, a rear member and a sensor stack disposed between the control member and the rear member. The sensor stack comprises a first layer comprising a compressible material, a second layer including a sensor and a backing layer. The backing layer and the control member have substantially the same shape. The rear member engages the backing layer such that the first layer is compressed toward the control member, thereby minimizing a gap between the second layer and the control member.

In another embodiment, for example, a handheld controller includes a main body and a sensor assembly at least partially disposed in the main body. The sensor assembly includes a control surface (e.g., a button) configured to receive at least a portion of a user's finger. A sensor portion is disposed between the control surface and a rear member. The sensor portion comprises a foam layer, a backing layer and a sensor layer (e.g., a capacitive touch-sensitive layer) between the foam layer and the backing layer. The foam layer is compressed toward the control surface to minimize an air gap between the sensor layer and the control surface. In some aspects, the backing layer and the control surface have substantially the same shape.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a pair of handheld controllers 100 according to a representative embodiment. The pair of handheld controllers 100 includes a right-hand controller 102 and a left-hand controller 104. The primary structure of the right-hand controller 102 and the left-hand controller 104 when held adjacent to each other in a similar orientation, as illustrated, are substantially symmetric with respect to each other. Both controllers 102/104 are described herein with respect to the right-hand controller 102, as both controllers include the same or similar features, albeit in mirror image. The right-hand controller 102 includes a main body 106 and a handle 108 extending from the main body 106. In some embodiments, a surrounding ring portion 110 extends from the main body 106. The controllers 102/104 can be part of a VR system 1. Each of the controllers 102/104 includes a plurality of tracking features positioned in a corresponding tracking pattern, such as the right-hand controller's tracking pattern 112. The tracking features in the tracking patterns are configured to be accurately tracked by a tracking camera 3 to determine the motion, orientation, and/or spatial position of the controller for reproduction in a virtual environment. The tracking features can include, for example, fiducial markers or light emitting diodes (LED).

The right-hand controller 102 further includes a sensor assembly 120 having a control member 122 (e.g., one or more buttons, knobs, switches) configured to receive touch input from a user's finger (e.g., a user's index finger). As described in further detail below with reference to FIGS. 3-4C, the sensor assembly 120 can be configured to detect the presence, movements and/or gestures of the user's finger(s) (e.g., a trigger-pull gesture). In the illustrated embodiment of FIG. 1, the control member 122 is shown as a trigger button and/or switch configured to at least partially retract toward the main body 106. In some embodiments, however, the control member 122 can comprise a stationary surface having a pressure sensitive sensor (e.g., a pressure-sensitive capacitive sensor).

Figure 2:
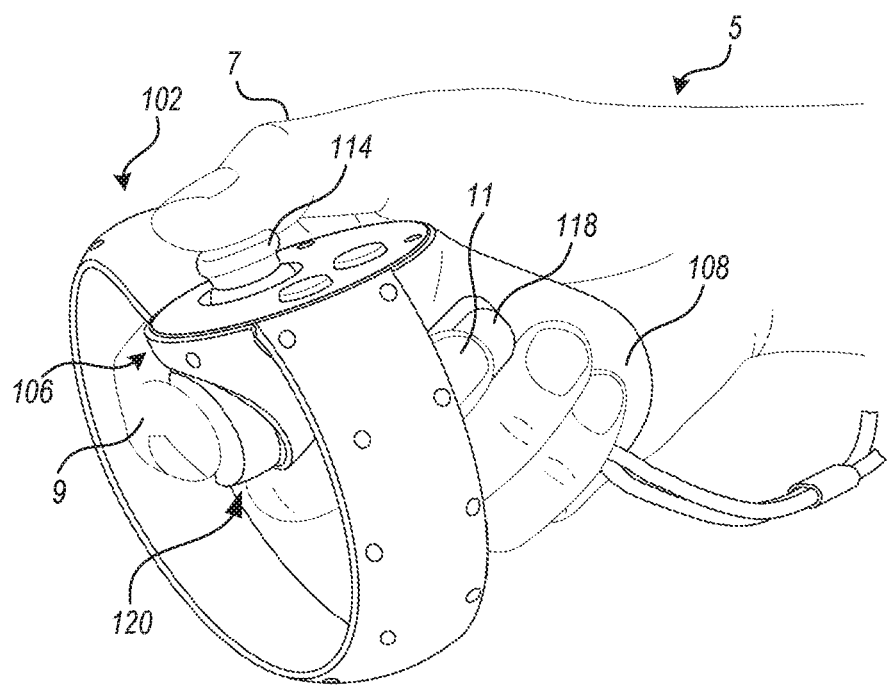
FIG. 2 is an isometric view of a user's right hand grasping the right-hand controller of FIG. 1.

As shown in FIG. 2, the handle portion 108 of the right-hand controller 102 is grasped by a user's right hand 5. When the controller 102 is grasped, the user's thumb 7 (i.e., the user's first finger) is positioned above the main body 106 and rests on a thumbstick 114. The user's second or index finger 9 is positioned on the control member 122. The user's third or middle finger 11 is positioned to contact a third finger button 118 on the handle portion 108. The controllers 102 and 104 are configured to detect a user's hand and/or finger gestures (e.g., a trigger-pull gesture, a thumbs-up gesture). As described in further detail below, the system 1 can be configured to detect a trigger-pull gesture when the user applies rearward pressure onto the control member 122 similar to the pulling of a gun trigger. The system 1 can be further configured to detect the presence of a user's finger on the control member 122 using, for example, one or more sensors (e.g., one or more capacitive touch sensors). The presence of a finger can include, for example, an indication that the user's finger is touching the sensor and/or hovering over the sensor within a selected distance (e.g., 1 cm or less).

Further explanation of finger and/or movement detection can be found, for example, in U.S. patent application Ser. No. 14/939,431, titled "HANDHELD CONTROLLER WITH THIRD FINGER GRIP DETECTION," filed Nov. 12, 2015, and U.S. patent application Ser. No. 14/939,470, titled "METHOD AND APPARATUS FOR DETECTING HAND GESTURES WITH A HANDHELD CONTROLLER," filed Nov. 12, 2015, and U.S. patent application Ser. No. 14/975,049, titled "HANDHELD CONTROLLER WITH ACTIVATION SENSORS," filed Dec. 18, 2015, and U.S. patent application Ser. No. 15/172,099, titled "HANDHELD CONTROLLER WITH HAND DETECTION SENSORS." The foregoing patent applications are hereby incorporated by reference in their entireties.

Figure 3:
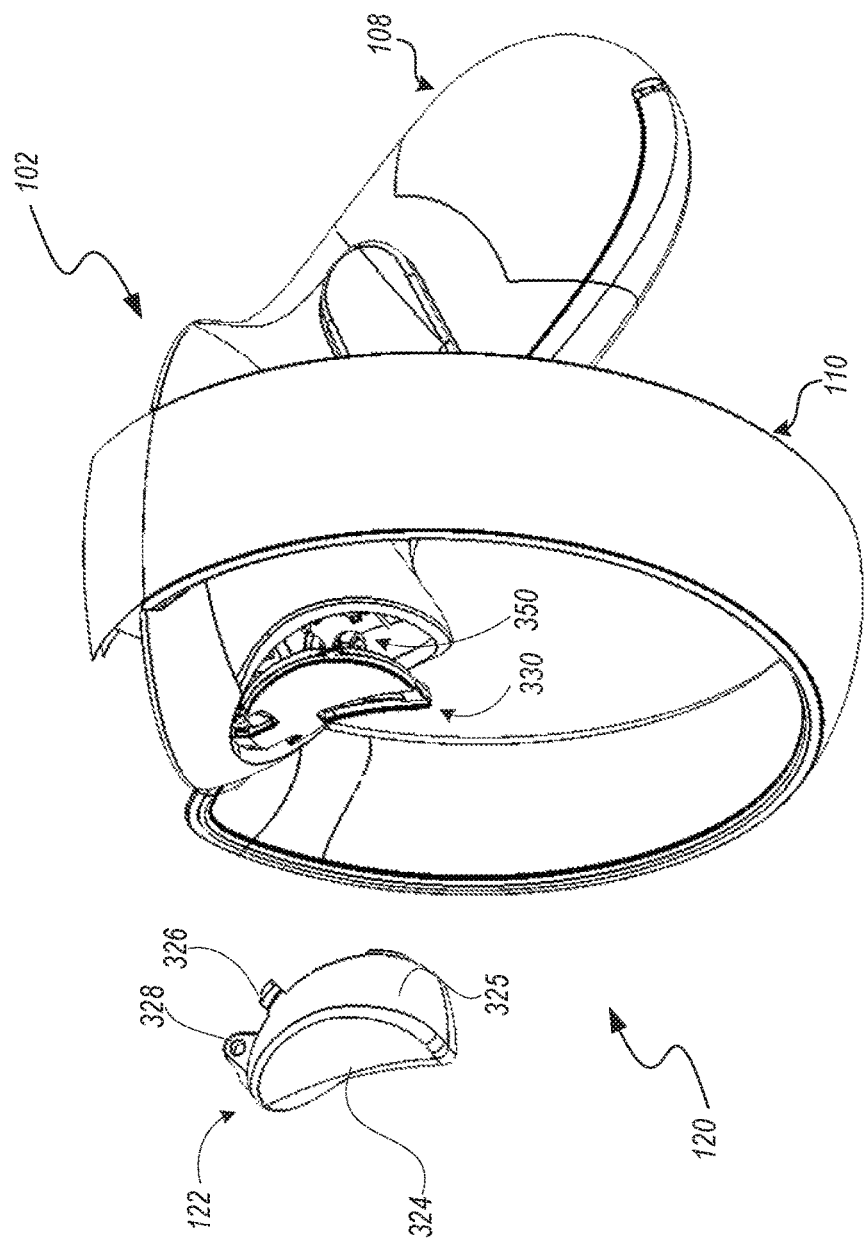
FIG. 3 is an isometric view of a portion of the right-hand controller shown in FIGS. 1 and 2.

FIG. 3 is an isometric side view of the controller 102 of FIGS. 1 and 2 with certain features of the controller 102 hidden for clarity. In the illustrated embodiment of FIG. 3, the controller 102 is shown with the control member 122 removed to show a sensor portion 330 and a rear portion 350 of the sensor assembly 120. As explained in further detail below in reference to FIGS. 4A-4C, the sensor portion 330 can include one or more sensors configured to detect a gesture of the user's index finger 9 (FIG. 2) (e.g., a trigger-pull gesture) and/or to detect a presence or spatial movement of the user's index finger 9 on or proximate to the control member 122.

The control member 122 includes a control surface 324 configured to receive at least a portion of the user's index finger 9 (FIG. 2). In some embodiments, the control surface 324 has a substantially three-dimensionally curved shape. In other embodiments, however, the control surface 324 may be substantially flat. In further embodiments, the control surface 324 can have any suitable shape. Moreover, in some embodiments, the control surface 324 may include a recess and/or a raised portion that provides the user tactile confirmation that the user's index finger 9 is positioned on the control surface 324. One or more retention features 326 (e.g., one or more tabs, projections, protrusions) extends from a side surface portion 325 and are configured to at least partially retain the control member 122 within the main body 106 of the controller 102 while allowing the control member 122 to move rearward and forward in response to movements of the user's index finger 9 (e.g., a trigger-pull movement). One or more holes 328 are configured to receive a pin (not shown) in the controller 102 that is configured to pivotally couple the control member 122 thereto.

Figure 4B:
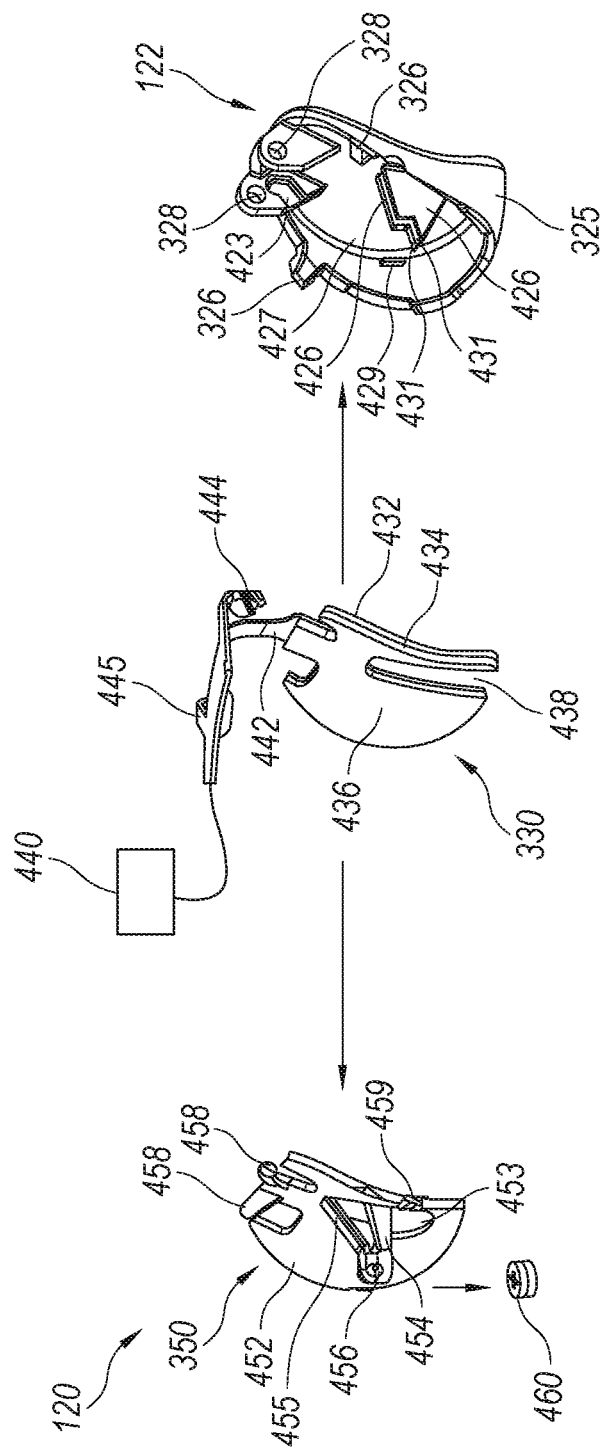
FIG. 4B is a partially exploded left side view of the sensor assembly shown in FIG. 4A.
Figure 4C:
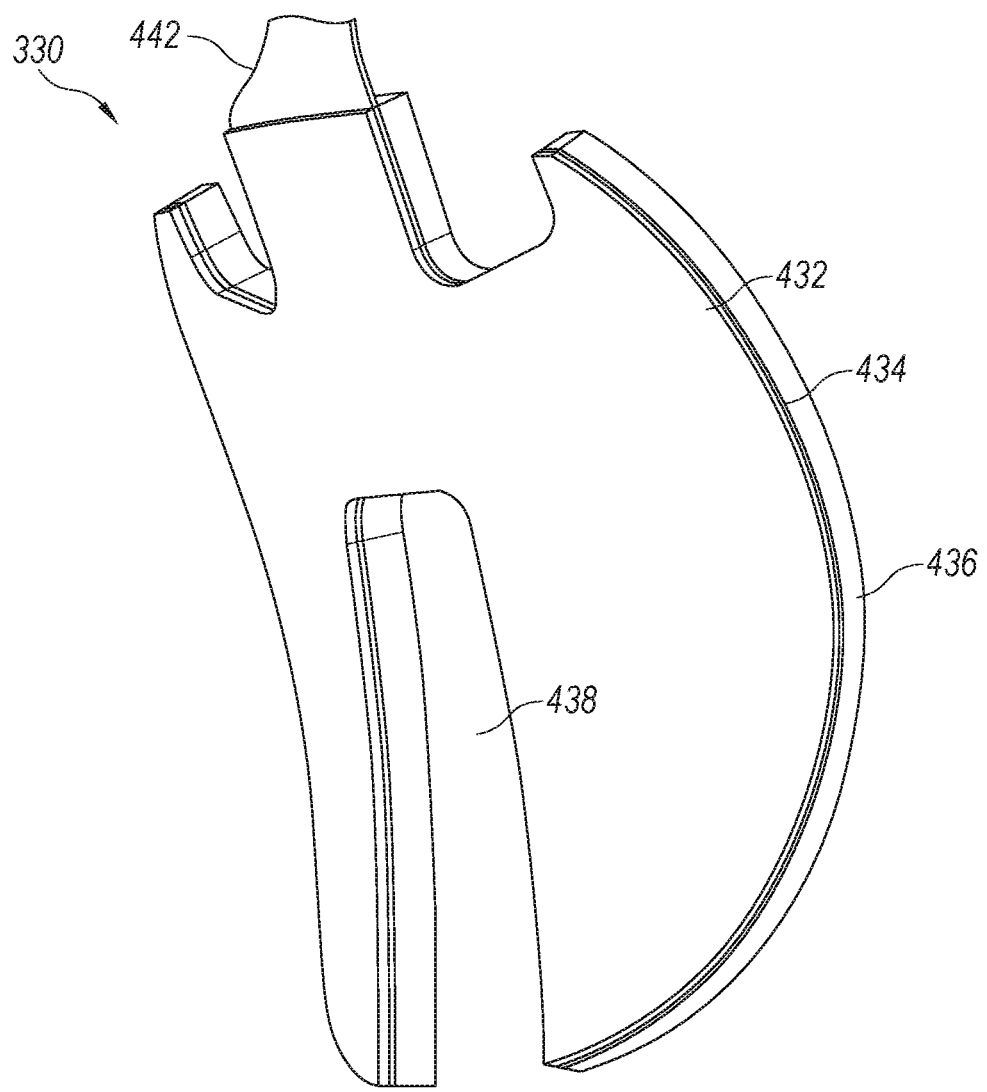
FIG. 4C is an enlarged view of a portion of FIG. 4A.

FIGS. 4A and 4B are partially exploded schematic right and left side views, respectively of the sensor assembly 120 shown with certain portions of the controller 102 hidden for clarity. FIG. 4C is an enlarged view of a portion of FIG. 4A. Referring to FIGS. 4A-4C together, the sensor assembly 120 has the sensor portion 330 between the rear portion 350 and the control member 122. The rear portion 350 includes a first surface 451 (FIG. 4A) facing toward the sensor portion 330, and an opposing second surface 452 (FIG. 4B) facing away from the sensor portion 330. A pair of arms 454 and 455 (FIG. 4B) extend rearwardly away from the second surface 452 and connect to a retention receptacle 456 configured to retain a magnet 460, such that the magnet moves with the sensor assembly 120 in response to a trigger pull or the like. In the illustrated embodiment, the rear side 427 of the control member 122 has rearwardly extending support members 426 that extend through a gap 438 in the sensor portion 330 and through an aperture 453 in the rear portion 350. The support members 426 define a shelf surface 431 positioned just below the retention receptacle 456 to help securely retain the magnet 460 in the retention receptacle 456. Accordingly, when the user presses against and moves the control member 122, such as during a trigger pull, the rear portion 350 and the associated magnet 460 move substantially simultaneously relative to the handle 108 (FIG. 3).

The top portion of the control member 122 securely snaps together with the rear portion 350 so as to firmly sandwich the sensor portion 330 therebetween. In the illustrated embodiment, the top portion of the control member 122 has a pair of grooves 423 (FIG. 4B) that receives corresponding projections 458 extending laterally from the top of the rear portion 350. The sides of the control member 122 also have notches or indents 429 (FIG. 4B) that receive corresponding attachment features 459 on corresponding sides of the rear portion 350. The attachment features 459 snap into the side indents 429, and the upper projections 458 snap into the grooves 423 via a friction fit, such that the rear portion 350 is securely fixed to the control member 122 and moveable together as a unit with the sensor portion 330 therebetween.

In the illustrated embodiment of FIGS. 4A-4C, the sensor portion 330 comprises a stack of layers including a first layer 432 facing toward the control member 122, a second layer 434 on the rear side of the first layer 432, and a third layer 436 on the rear side of the second layer 434 and facing toward the rear portion 350. In some embodiments, the first layer 432 comprises a compressible, conductive material, and the second layer 434 supports a sensor, such as a capacitive touch-sensor, pressure sensor, a proximity sensor, or other sensor, configured to detect the presence of a user's finger on or adjacent to the sensor assembly 120.

The first layer 432 may include, for example, a conductive foam material configured to be compressible to a suitably small thickness (e.g., less than 1 mm) to minimize air gaps between the control member 122 and the sensor on the second layer 434. In other embodiments, the first layer 432 comprises any suitable material having a dielectric constant different than air (e.g., a material having a dielectric constant greater than 1.0). The third layer 436 comprises a backing layer having substantially the same shape as the first and second layers 432 and 434. In some embodiments, the third layer 436 comprises a rigid material (e.g., a metal, a plastic) that provides structural integrity to the sensor portion 330 and provides a backing that can react compressive forces applied to the compressible first layer 432.

In operation, a compressive force between the rear portion 350 and the control member 122 urges the third layer 436 toward the control member 122, thereby compressing the first layer 432 toward the rear surface of the control member. This configuration keeps the sensor portion 330 in contact with the control member 122 and eliminates any dead space therebetween. Accordingly, any movement of the control member is immediately translated to the sensor portion 330 and the rear portion, which improves the detection of a user's index finger on the control member 122 by improving sensitivity and responsiveness of the touch-sensitive sensor comprising the second layer 434. The configuration with the compressible first layer 432 of the sensor portion 330 provides a smooth trigger feel for the sensor assembly 120 throughout the full travel or stroke during a trigger pull movement. The compressible first layer 432 of the sensor portion 330 also adds a biasing force to help return the sensor assembly 120 to an extended, released position, for example after a user releases the sensor assembly 120 after a trigger pull movement.

A flexible electrical link 442 (e.g., one or more wires, cables, circuits) electrically couples the sensor portion 330 to electronics 440 (e.g., electronic components on one or more printed circuit boards) in the controller's main body 106 and/or handle 108. In some embodiments, the electronics 440 can include one or more electronic components configured to electrically couple the controller 102 to the system 1. In some embodiments, the electronics 440 includes one or more electrical power sources (e.g., one or more batteries) configured to provide electrical power to the sensor portion 330 and other electronic components in and/or on the controller 102. A plurality of sensors 444 and 445 are also electrically coupled to the electronics 440 and can be configured to determine movement of the control member 122. In some embodiments, for example, the sensors 444 and 445 comprise one or more Hall effect sensors connected to a fixed mounting portion 446, which is connected to the flexible electrical links 441, such that the control member 122, the sensor portion 330, and rear portion 350 can move substantially as a unit relative to the mounting portion 446 and the sensors 444 and 445. Accordingly, the sensors 444 and 445 can be configured to detect movement of a magnet 460 indicative of the user's finger movement on the control assembly 120, such as a trigger-pull movement.

REMARKS

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative languages and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A handheld controller, comprising:
   a housing; and
   a button at least partially disposed in the housing, wherein the button includes a control member, a rear member, and a sensor stack disposed between the control member and the rear member, wherein the control member, the rear member, and the sensor stack are movable as a unit relative to the housing, and wherein the sensor stack comprises—
   a first layer including a compressible material and facing toward a rear side of the control member;
   a second layer including a sensor, the second layer directly adjacent a rear side of the first layer; and
   a third layer directly adjacent a rear side of the second layer, wherein at least portions of the first layer, the second layer, the third layer, and the control member have substantially the same contoured shape, and wherein the rear member engages the third layer such that the first layer is compressed toward the control member by way of the rear member being fixed to the control member via a friction fit, thereby minimizing a gap between the second layer and the control member.

2. The handheld controller of claim 1 wherein the compressible material comprises a conductive foam.

3. The handheld controller of claim 1 wherein the first layer is configured to have a compressed thickness less than 1 mm.

4. The handheld controller of claim 1 wherein the compressible material has a dielectric constant different than the dielectric constant of air.

5. The handheld controller of claim 1 wherein the sensor is a touch-sensitive sensor.

6. The handheld controller of claim 1 wherein the sensor is a capacitive sensor.

7. The handheld controller of claim 1 wherein the sensor is a first sensor, and further comprising a second sensor configured to detect movement of the button relative to the housing.

8. The handheld controller of claim 7 wherein the second sensor comprises a Hall effect sensor configured to detect movement of a magnet coupled to the rear member.

9. A handheld controller, comprising:
   a main body; and
   a sensor assembly at least partially disposed in the main body, wherein the sensor assembly includes a control member, a rear member, and a sensor portion disposed between the control member and the rear member, wherein the control member, the rear member, and the sensor portion are movable as a unit relative to the main body, and wherein the sensor portion comprises a foam layer facing toward a rear side of the control member, a backing layer, and a sensor layer between and directly adjacent to the foam layer and the backing layer, and wherein the foam layer is compressed toward the rear side of the control member to minimize an air gap between the sensor layer and the control member by way of the rear member being fixed to the control member via a friction fit.

10. The handheld controller of claim 9 wherein at least portions of the backing layer, the sensor layer, the foam layer, and the control member have substantially the same shape.

11. The handheld controller of claim 9 wherein the sensor layer comprises a capacitive touch-sensitive layer.

12. The handheld controller of claim 9 wherein the foam layer has a compressed thickness less than 1 mm.

13. The handheld controller of claim 9, further comprising a second sensor configured to detect movement of the control member relative to the main body.

14. The handheld controller of claim 13 wherein the second sensor comprises a Hall effect sensor configured to detect movement of a magnet disposed on a support structure extending from the control member through the sensor portion toward the rear member.

15. The handheld controller of claim 13, further comprising electronics in the main body configured to communicatively couple the sensor layer to a virtual reality system.

16. A handheld controller, comprising:
   a main body;
   a handle extending from the main body;
   a trigger button connected to the handle and positioned for engagement by a finger of a user, the trigger button comprising a control member, a rear member, and a sensor stack between the control member and the rear member and immediately adjacent to the control member, wherein the control member, the rear member, and the sensor stack are movable as a unit relative to the handle, and wherein the sensor stack comprises—
   a first layer including a compressible material and facing toward a rear side of the control member;
   a second layer including a sensor, the second layer directly adjacent a rear side of the first layer; and
   a third layer directly adjacent a rear side of the second layer, wherein at least portions of the first layer, the second layer, the third layer, and the control member have substantially the same shape, and wherein the rear member engages the third layer such that the first layer is compressed toward the control member by way of the rear member being fixed to the control member via a friction fit, thereby minimizing a gap between the second layer and the control member.

17. The handheld controller of claim 16 wherein the compressible material comprises a conductive foam.

18. The handheld controller of claim 16 wherein the compressible material has a dielectric constant different than the dielectric constant of air.

19. The handheld controller of claim 16 wherein the sensor is a capacitive sensor.

20. The handheld controller of claim 16 wherein the sensor is a first sensor, and further comprising a second sensor connected to the sensor stack and configured to detect movement of the trigger button relative to the handle.

* * * * *